United States Patent
Finch et al.

(10) Patent No.: US 10,988,558 B2
(45) Date of Patent: Apr. 27, 2021

(54) CONTROLLED PARTICLE SIZE DISTRIBUTION

(71) Applicants: DDP SPECIALTY ELECTRONIC MATERIALS US, LLC, Wilmington, DE (US); DDP SPECIALTY ELECTRONIC MATERIALS US 8, LLC, Collegeville, PA (US)

(72) Inventors: John David Finch, North Wales, PA (US); James A. Jagodzinski, Midland, MI (US)

(73) Assignees: DDP SPECIALTY ELECTRONIC MATERIALS US, INC., Collegeville, PA (US); DDP SPECIALTY ELECTRONIC MATERIALS US 8, LLC, Collegeville, PA (US)

( * ) Notice: Subject to any disclaimer, the term of this patent is extended or adjusted under 35 U.S.C. 154(b) by 138 days.

(21) Appl. No.: 16/342,355

(22) PCT Filed: Nov. 6, 2017

(86) PCT No.: PCT/US2017/060138
§ 371 (c)(1),
(2) Date: Apr. 16, 2019

(87) PCT Pub. No.: WO2018/089296
PCT Pub. Date: May 17, 2018

(65) Prior Publication Data
US 2020/0048386 A1    Feb. 13, 2020

Related U.S. Application Data

(60) Provisional application No. 62/419,126, filed on Nov. 8, 2016.

(51) Int. Cl.
| | | |
|---|---|---|
| *C08F 212/08* | (2006.01) | |
| *C08F 20/14* | (2006.01) | |
| *C08F 2/18* | (2006.01) | |
| C08F 12/08 | (2006.01) | |
| C08F 212/36 | (2006.01) | |

(52) U.S. Cl.
CPC ............. *C08F 212/08* (2013.01); *C08F 2/18* (2013.01); *C08F 12/08* (2013.01); *C08F 20/14* (2013.01); *C08F 212/36* (2013.01); *C08F 2800/20* (2013.01)

(58) Field of Classification Search
CPC .. C08F 2/18; C08F 12/08; C08F 12/36; C08F 212/08; C08F 212/36; C08F 20/10; C08F 20/14
See application file for complete search history.

(56) References Cited

U.S. PATENT DOCUMENTS

| | | | |
|---|---|---|---|
| 4,444,960 A | 4/1984 | Salee et al. | |
| 4,444,961 A | 4/1984 | Timm | |
| 5,990,221 A * | 11/1999 | Dames | ...................... C08F 2/24 524/457 |
| 7,727,555 B2 | 6/2010 | DiCarlo et al. | |
| 9,028,730 B2 * | 5/2015 | Kosvintsev | ......... B01F 11/0082 264/14 |
| 9,309,363 B2 * | 4/2016 | Finch | ........................ B01J 39/19 |
| 9,415,530 B2 * | 8/2016 | Fukuda | ............... B01F 11/0082 |
| 10,526,710 B2 * | 1/2020 | Kosvintsev | ................ C08F 2/18 |
| 2009/0105431 A1 * | 4/2009 | Bankholt | ................. C08F 14/06 526/88 |
| 2014/0080981 A1 * | 3/2014 | Ashutosh | ................... C08F 2/01 526/88 |
| 2014/0264984 A1 | 9/2014 | Kosvintsev | |
| 2015/0064468 A1 | 3/2015 | Finch et al. | |
| 2015/0328608 A1 * | 11/2015 | Liu | ........................... B01J 4/007 526/273 |
| 2019/0233554 A1 * | 8/2019 | Finch | .................... C08F 212/08 |

FOREIGN PATENT DOCUMENTS

EP    2341081 A1    7/2011

OTHER PUBLICATIONS

International Search Report, dated Jan. 18, 2018, for International Application No. PCT/US2017/060138, filed Nov. 6, 2017; ISA/EPO; Authorized officer Rudolf Lux.

* cited by examiner

*Primary Examiner* — Rip A Lee
(74) *Attorney, Agent, or Firm* — Carl P. Hemenway; Kenneth Grimaldi (57) ABSTRACT

Provided is a method of making a collection of polymer beads comprising
 (a1) forming a first collection of monomer droplets in an aqueous medium in a container, wherein the first collection of monomer droplets has volume-average diameter DAV1 and has uniformity coefficient less than 1.3;
 (a2) forming a second collection of monomer droplets in the aqueous medium in the container, wherein the second collection of monomer droplets has volume-average diameter DAV2 and has uniformity coefficient less than 1.3, wherein DAV1 and DAV2 differ by 10 μm or more;
 wherein either step (a1) and step (a2) are performed simultaneously; or step (a2) is performed after step (a1), while the first collection of monomer droplets remains in the container; or a combination thereof; and
 (b) after steps (a1) and (a2), polymerizing the monomer droplets by suspension polymerization to form the polymer beads.

4 Claims, 6 Drawing Sheets

CONTROLLED PARTICLE SIZE DISTRIBUTION

When considering a collection of polymer beads, it is important to consider the distribution of particle sizes in the collection. Polymer beads produced by aqueous suspension polymerization often have a distribution of particles sizes that is unimodal. That is, when the occurrence of particles is plotted versus diameter, only a single significant peak is observed. In such cases, the peak is often approximated by a Gaussian distribution, in which the occurrence as a function of diameter (d) is proportional to the function $\exp(-(d-\mu)^2/(2\sigma^2))$, where $\mu$ is the mean and $\sigma$ is the standard deviation. Such distributions of particle size are also characterized by the uniformity coefficient ("UC," defined below). Unimodal distributions having UC greater than 1.5 are referred to herein as "typical Gaussian," while unimodal distributions having UC less than 1.3 are referred to herein as "uniform."

A drawback associated with a typical Gaussian f spherical particles that are all the same size, the particles do not pack efficiently to fill a volume of space. It is desired to provide a collection of polymer particles, and a method of making those particles, that provide one or more of the following benefits: there is small or no loss of production yield due to sifting, and/or the packing efficiency of the particles is good. It is also desired to provide polymer particles that are useful as ion exchange resins and/or as adsorbent resins.

One method of making particles is described in U.S. Pat. No. 7,727,555, which describes a method of making particles that involves forming a stream of a mixture including a first material and a second material (for example, a polymer and a gelling precursor), exposing the stream to vibration, and treating the stream to form particles including the first material. It is desired to provide a process of making particles that is consistent with aqueous suspension polymerization, and it is desired to provide a collection of particles suitable as ion exchange resin and/or as adsorbent resins.

The following is a statement of the invention.

A first aspect of the present invention is a method of making a collection of polymer beads comprising
(a1) forming a first collection of monomer droplets in an aqueous medium in a container, wherein the first collection of monomer droplets has volume-average diameter DAV1 and has uniformity coefficient less than 1.3;
(a2) forming a second collection of monomer droplets in the aqueous medium in the container, wherein the second collection of monomer droplets has volume-average diameter DAV2 and has uniformity coefficient less than 1.3, wherein DAV1 and DAV2 differ by 10 µm or more;
wherein either step (a1) and step (a2) are performed simultaneously; or step (a2) is performed after step (a1), while the first collection of monomer droplets remains in the container; or a combination thereof; and
(b) after steps (a1) and (a2), polymerizing the monomer droplets by suspension polymerization to form the polymer beads.

A second aspect of the present invention is a collection of polymer beads, wherein the volume distribution expressed as a function of bead diameter comprises
(A1) a first peak having a maximum of PM1 at diameter PD1 and having full width at half maximum of 75 µm or less,
(A2) a second peak having a maximum of PM2 at diameter PD2 and having full width at half maximum of 75 µm or less; and
(B1) a valley having a minimum value of VM1 at a diameter between PD1 and PD2, wherein VM1 is less than 0.25*PM1 and VM1 is also less than 0.25*PM2. wherein the polymer beads comprise polymerized units of one or more monofunctional vinyl monomer and one or more multifunctional vinyl monomer.

The following is a brief description of the drawings.

The following is a detailed description of the invention.

As used herein, the following terms have the designated definitions, unless the context clearly indicates otherwise.

A "polymer," as used herein, is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Vinyl monomers have the structure where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers. Some vinyl monomers have one or more polymerizable carbon-carbon double bonds incorporated into one or more of $R^1$, $R^2$, $R^3$, and $R^4$; such vinyl monomers are known herein as multifunctional vinyl monomers. Vinyl monomers with exactly one polymerizable carbon-carbon double bond are known herein as monofunctional vinyl monomers.

Styrenic monomers are vinyl monomers in which each of $R^1$, $R^2$, and $R^3$ is hydrogen and —$R^4$ has the structure where each of $R^5$, $R^6$, $R^7$, $R^8$, and $R^9$ is, independently, a hydrogen, a halogen, an aliphatic group (such as, for example, an alkyl group or a vinyl group), a substituted aliphatic group, an aryl group, a substituted aryl group, another substituted or unsubstituted organic group, or any combination thereof.

Acrylic monomers are vinyl monomers in which each of $R^1$ and $R^2$ is hydrogen; $R^3$ is either hydrogen or methyl; and —$R^4$ has one of the following structures:

where each of $R^{11}$, $R^{12}$, and $R^{14}$ is, independently, hydrogen, a $C_1$ to $C_{14}$ alkyl group, or a substituted $C_1$ to $C_{14}$ alkyl group.

A reaction among monomers to form one or more polymers is referred to herein as a polymerization process. The residue of a monomer after a polymerization process has taken place is known herein as a polymerized unit of that monomer.

Polymer beads are individual particles, each containing 50% or more by weight of polymer. Beads are in the solid state at 23° C. Beads have volume-average diameter of 1 μm or greater. If a particle is not spherical, the diameter of the particle is taken herein to be the diameter of an imaginary sphere that has the same volume as the particle. How close a particle is to perfect spherical shape is assessed by first characterizing the three mechanical principal axes of the particle, a (the longest principal axis), b, and c (the shortest principal axis). A particle is considered herein to spherical or nearly spherical if the quotient (b/a) is 0.667 or greater and the quotient (c/b) is 0.667 or greater. As used herein the indicator of sphericity ($\Psi$) is calculated as follows:

$$\Psi = \sqrt[3]{bc/a^2}$$

As used herein, a chemical group is said herein to be "substituted" if a substituent (that is, an atom or chemical group) is attached. Suitable substituents include, for example, alkyl groups, alkynyl groups, aryl groups, halogen atoms, nitrogen-containing groups including amine groups, oxygen-containing groups including carboxyl groups, sulfur-containing groups including sulfonic acid groups, nitrile groups, and combinations thereof.

Droplets are individual particles of material in the liquid state. Droplets are dispersed in a continuous fluid medium, either liquid or gas. Droplets have volume-average diameter of 1 μm or higher. A continuous fluid medium is an "aqueous medium" if the continuous fluid medium contains 50% or more water by weight based on the weight of the continuous fluid medium. Substances dissolved into solution are considered herein to be part of the continuous fluid medium. Substances that are present as particles dispersed in the continuous fluid medium are not considered herein to be part of the continuous fluid medium.

A collection of particles is characterized by the volume-based distribution of diameters. The parameter DAV is the volume-average diameter of the collection of particles. The parameter D60 denotes the value of a diameter that has the property that exactly 60% of the collection of the particles, by volume, have diameter less than or equal to D60. The parameter D10 denotes the value of a diameter that has the property that exactly 10% of the collection of the particles, by volume, have diameter less than or equal to D10. The parameter "uniformity coefficient" (abbreviated "UC") is UC=D60/D10. The parameter D80 denotes the value of a diameter that has the property that exactly 80% of the collection of the particles, by volume, have diameter less than or equal to D80.

A collection of particles is also characterized by the harmonic mean diameter (HMD), which is defined as $$HMD = \frac{N}{\sum_{i=1}^{N}\left(\frac{1}{d_i}\right)}$$

Two numbers are said herein to "differ" by a specific amount if the absolute value of the difference between the two numbers is that specific amount.

As used herein, an initiator is a molecule that is stable at ambient conditions but that is capable under certain conditions of producing one or more fragments that bears a free radical, and that fragment is capable of interacting with a monomer to start a free radical polymerization process. The conditions that cause production of a fragment bearing a free radical include, for example, elevated temperature, participation in an oxidation-reduction reaction, exposure to ultraviolet and/or ionizing radiation, or a combination thereof.

The present invention involves a method of making polymer beads. The method involves providing a first collection of monomer droplets in an aqueous medium. The aqueous medium preferably contains water in an amount of 75% or more; more preferably 85% or more. The first collection of particles has volume average diameter of DAV1. Preferably, DAV1 is 100 μm or greater; more preferably 200 μm or greater. Preferably, DAV1 is 1,000 μm or lower; more preferably 600 μm or lower. the first collection of particles has uniformity coefficient (UC) of 1.3 or less; more preferably 1.25 or less; more preferably 1.2 or less; more preferably 1.15 or less; more preferably 1.1 or less.

The first collection of monomer droplets contains monomer. Preferably, the amount of monomer in the droplets is 50% or more by weight, based on the weight of the droplets; more preferably 75% or more; more preferably 85% or more; more preferably 95% or more. Preferred monomers are vinyl monomers. Preferably the amount of vinyl monomer in the first collection of monomer droplets, by weight based on the weight of all monomers, is 75% or more; more preferably 85% or more; more preferably 95% or more; more preferably 99% or more. Preferred monomers are styrenic monomers and acrylic monomers. Preferably the sum of the amount of styrenic monomers plus the amount of acrylic monomers is, by weight based on the weight of all monomers, 75% or more; more preferably 85% or more; more preferably 95% or more; more preferably 99% or more. Among styrenic monomers, preferred are styrene and divinylbenzene. Among acrylic monomers, preferred are acrylonitrile and methyl acrylate.

In the first collection of monomer droplets, preferably the droplets contain one or more monofunctional vinyl monomer. Preferably the amount of monofunctional vinyl monomer is, by weight based on the weight of all monomers, 25% or more; more preferably 50% or more; more preferably 75% or more. Preferably the amount of monofunctional vinyl monomer is, by weight based on the weight of all monomers, 99.5% or less. Preferred monofunctional vinyl monomers are styrene, ethylbenzene, methyl acrylate, acrylonitrile, and mixture thereof; more preferably styrene, ethylbenzene, and mixtures thereof.

In the first collection of monomer droplets, preferably the droplets contain one or more multifunctional vinyl monomer. Preferably the amount of multifunctional vinyl monomer is, by weight based on the weight of all monomers, 1% or more; more preferably 2% or more; more preferably 4% or more; more preferably 5% or more. The amount of multifunctional vinyl monomer is, by weight based on the weight of all monomers, 100% or less; preferably 99.5% or less; more preferably 50% or less; more preferably 30% or less; more preferably 25% or less; more preferably 15% or less. Preferred multifunctional monomer is divinylbenzene.

In the first collection of monomer droplets, preferably the droplets contain one or more initiator. Preferred initiators have solubility in 100 mL of water at 25° C. of 1 gram or less; more preferably 0.5 gram or less; more preferably 0.2 gram or less; more preferably 0.1 gram or less. Preferred initiators are peroxygen initiators. Preferably, the amount of initiator in the droplets is, by weight based on the weight of the droplets, 0.05% or more; more preferably 0.1% or more. Preferably, the amount of initiator in the droplets is, by weight based on the weight of the droplets, 10% or less; more preferably 5% or less.

In the first collection of monomer droplets, the composition of the droplets may be characterized by the sum of the amounts of all monomers and all initiators. Preferably, the sum of the weights of all monomers and all initiators is, based on the weight of the droplets, 75% or more; more preferably 85% or more. Preferably, the sum of the weights of all monomers and all initiators is, 100% or less.

Preferably, the first collection of monomer droplets has volume average sphericity W of 0.7 to 1.0; more preferably 0.8 to 1.0; more preferably 0.9 to 1.0.

The first collection of monomer droplets may be made by any method. A preferred method is by vibratory excitation of a laminar jet of a liquid that contains monomer flowing into a continuous aqueous medium. A suitable method of performing such a method is described in U.S. Pat. No. 4,444,961. The suitable and preferred compositions for the liquid that contains monomer are the same as described above for the suitable and preferred compositions of monomer droplets.

The method of the present invention also involves forming a second collection of monomer droplets. The suitable and preferred composition, distribution (including DAV and UC), and method of making the second collection of monomer droplets are all the same as those described above for the first collection of monomer droplets. These characteristics of the second collection of monomer droplets are chosen independently of the characteristics of the first collection of monomer droplets. The composition of the second collection of monomer droplets may be the same as or different from the composition of the first collection of monomer droplets; preferably the composition of the second collection of monomer droplets has the same composition as the first collection of monomer droplets.

The second collection of monomer droplets has a volume-average diameter DAV2, which is different from DAV1. The quantities DAV1 and DAV2 differ by 10 μm or more. That is, the absolute value of (DAV1-DAV2) is 10 μm or more. Preferably DAV1 and DAV2 differ by 25 μm or more; more preferably 50 μm or more; more preferably 75 μm or more. DAV2 may be larger or smaller than DAV1.

In the practice of the present invention, the second collection of monomer droplets is made either under condition (I) or under condition (II) or under a combination of conditions (I) and (II). In condition (I), the first and second collections of monomer droplets are made simultaneously. One way of making the first and second collections of monomer drops simultaneously (i.e., under condition (I)) would be to use the method described in U.S. Pat. No. 4,444,961 using two separate feeds through two separate jets, discharging monomer droplets into the same aqueous medium. The feed through one jet could be adjusted to produce a collection of monomer droplets having volume-average diameter DAV1 and having UC of 1.3 or less. The feed through the other jet could be adjusted to produce a collection of monomer droplets having volume-average diameter DAV2 and having UC of 1.3 or less, where DAV1 and DAV2 differed by 10 μm or more.

In condition (II), the second collection of monomer droplets is made after the first collection of monomer droplets, and the second collection of monomer droplets is formed in the presence of the first collection of monomer droplets. For example, a first collection of monomer droplets could be made by using the method described in U.S. Pat. No. 4,444,961 to produce a collection of monomer droplets in an aqueous medium having DAV1 in an aqueous medium. Then, using the same feed and the same jet, the conditions of jetting could be changed to produce a collection of monomer droplets having DAV2, different from DAV1 by 10 μm or more, and the jet could discharge the second collection of monomer droplets into the aqueous medium that already contained the first collection of monomer droplets.

A variety of combinations of condition (I) and condition (II) are envisioned. For one example, the method in U.S. Pat. No. 4,444,961 could be used, and the jetting conditions that produce the first collection of monomer droplets could be alternated with the jetting conditions that produce the second collection of monomer droplets. For another example, production of the first collection of monomer droplets could be begun, and at a later time, prior to the completion of the production of the first collection of monomer droplets, a separate feed with a separate jet, using different conditions but discharging into the same aqueous medium, could be begun and operated for a time to simultaneously produce monomer droplets that belong to the first and second collections of monomer droplets.

Preferably the method of the present invention also involves forming one or more additional collections of monomer droplets. The suitable and preferred compositions, distributions, and methods of making are the same as those described above for the first and second collections of monomer droplets. These characteristics of each additional collection of monomer droplets are chosen independently of the characteristics of the other collections of monomer droplets. The compositions of the various collections of monomer droplets may be the same as each other or different from each other. Preferably the compositions of the various collections of monomer droplets are all the same.

Preferably each additional collection of monomer droplets has DAV that is different by 10 μm or more from the DAV of one or more of the other collections of monomer droplets that are present.

Preferably each additional collection of monomer droplets is made either simultaneously with one or more of the other collections of monomer droplets or else is made in the presence of one or more of the other collections of monomer droplets or a combination thereof. The discussion above regarding condition (I) and condition (II) preferably apply to each pair of collections of monomer droplets. In one embodiment, for example, all the collections of monomer droplets are made in sequence, one after the other. In another embodiment, for example, all the collections of monomer droplets are made simultaneously.

The monomer droplets are present in an aqueous medium. Preferably the aqueous medium contains one or more suspending agent. Preferred suspending agents are gelatins, polyvinyl alcohols, starches, polyacrylic acids, salts of polyacrylic acids; magnesium silicate; cellulose ethers; and mixtures thereof. More preferred are gelatin, polyvinyl alcohol, carboxymethylcellulose, and mixtures thereof. Preferably, the amount of suspending agent in the aqueous medium is, by weight based on the weight of the aqueous medium, 0.05% or more; more preferably 0.075% or more. Preferably, the amount of suspending agent in the aqueous medium is, by weight based on the weight of the aqueous medium, is 5% or less; more preferably 3% or less.

When all the collections of monomer droplets have been made, and all the collections of monomer droplets are present in the same aqueous medium, the resulting composition is known herein as the "final composite collection of monomer droplets." Preferably the total amount of all monomer droplets is, by weight based on the total weight of the final composite collection of monomer droplets, 5% or more; more preferably 10% or more; more preferably 20% or more; more preferably 30% or more. Preferably the total amount of all monomer droplets is, by weight based on the total weight of the final composite collection of monomer droplets, 65% or less; more preferably 60% or less; more preferably 55% or less.

Preferably, the volume distribution of diameters of the final composite collection of monomer droplets has D10 of 200 µm or higher; more preferably 300 µm or higher. Preferably, the volume distribution of diameters of the final composite collection of monomer droplets has D80 of 1,000 µm or smaller; more preferably 900 µm or smaller; more preferably 800 µm or smaller.

The final composite collection of monomer droplets is subjected to polymerization conditions. The nature of the polymerization conditions depends in part on the nature of the initiator that is used. Polymerization conditions involve conditions in which the initiator forms sufficient free radicals to initiate the polymerization process. For example, when a thermal initiator is used, polymerization conditions involve establishing a temperature above 25° C. that is high enough for a significant fraction of the initiator molecules to decompose to form free radicals. For another example, if a photoinitiator is used, polymerization conditions involve exposing the initiator to radiation of sufficiently low wavelength and of sufficiently high intensity for a significant fraction of the initiator molecules to decompose to form free radicals. For another example, when the initiator is a redox initiator, polymerization conditions involve the presence of sufficiently high concentration of both the oxidant and the reductant such that a significant number of free radicals are produced. Preferably, a thermal initiator is used. Preferably, polymerization conditions involve temperature of 65° C. or higher; more preferably 75° C. or higher.

After the polymerization process is complete, the resulting composition is preferably brought to ambient temperature (approximately 23° C.). Preferably, water and water-soluble compounds are separated from the polymer beads formed in the polymerization process. After removal of water, the polymer beads preferably contain water in the amount, by weight based on the total weight of the polymer beads, of 20% or less; more preferably 15% or less; more preferably 10% or less; more preferably 7% or less. After removal of water, the polymer beads preferably contain water in the amount, by weight based on the total weight of the polymer beads, of 1% or more; more preferably 2% or more; more preferably 3% or more.

The collection of polymer beads is preferably subjected to a sieve process to remove very small and very large particles. Preferably the collection of polymer beads is passed through a sieve having mesh number 14 or higher; 16 or higher; more preferably 18 or higher; more preferably 20 or higher. Preferably the collection of polymer beads is retained on a sieve having mesh number 100 or lower; more preferably 80 or lower; more preferably 70 or lower; more preferably 60 or lower.

Preferably, the amount of material lost in the sieving process, by weight based on the weight of the collection of polymer beads prior to sieving, is 25% or less; more preferably 20% or less; more preferably 15% or less.

Figure 1:
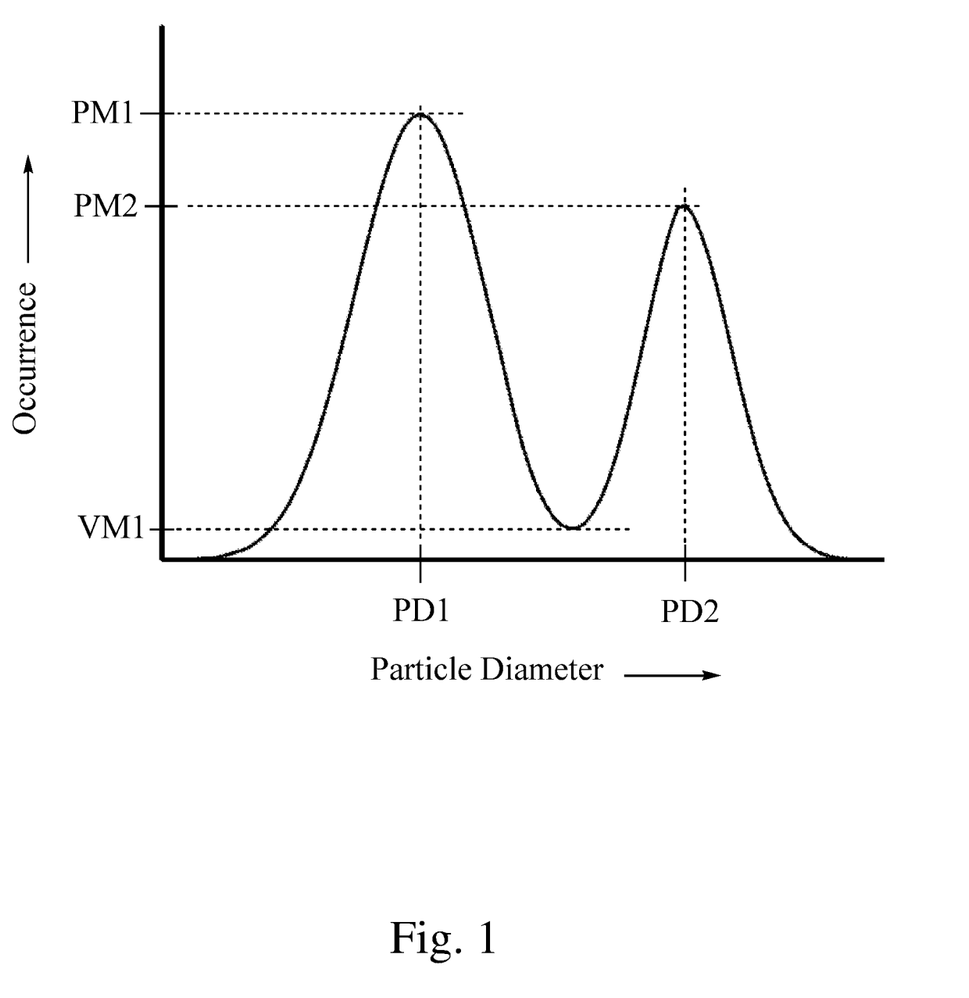
FIG. 1 shows an example of a distribution of particle diameters of a collection of polymer beads.

The polymerization conditions are chosen to promote suspension polymerization. In suspension polymerization, the monomer in the monomer droplets polymerizes to form polymer beads. The resulting collection of monomer beads may be characterized by the distribution, on a volume basis, of the bead diameters. An example of such a distribution is shown in FIG. 1.

The second aspect of the present invention involves a collection of polymer beads, where the collection has certain characteristics. The collection of polymer beads may be made by any method. The preferred method of making the collection of polymer beads is by methods of the first aspect of the present invention.

The volume distribution of the bead diameters shows two or more peaks. The distribution has a first peak and a second peak that meet the following criteria. The first peak has a maximum value of PM1, which occurs at diameter value of PD1. The full width at half maximum of the first peak is 75 µm or less. The second peak has a maximum value of PM2, which occurs at diameter value of PD2. The full width at half maximum of the second peak is 75 µm or less. PD1 and PD2 differ by 25 µm or more. The volume distribution of the polymer bead diameters shows a valley that has a minimum value of VM1 that occurs at diameter value that lies between PD1 and PD2. The value VM1 is less than 0.25*PM1, and the value VM1 is also less than 0.25*PM2. FIG. 1 illustrates the assignment of PD1, PM1, PD2, PM2, and VM1 to features on a volume distribution of particle diameters.

Preferably, the full width at half maximum of the first peak is 60 µm or less. Preferably, the full width at half maximum of the second peak is 60 µm or less.

The label "first peak" and "second peak" may be applied to any pair of peaks that meet the above criteria, including the existence of the required valley between the peaks. PD1 may be larger or smaller than PD2. PM1 may be smaller or larger than PM2. Additional peaks may appear between the first peak and the second peak, as long as all the above criteria are met, including the existence of the required valley. Preferably, the volume distribution of the polymer bead diameters contains three or more peaks, and one or more sets of three of the peaks can be identified, such that within each set of three peaks, each pair of two peaks qualifies as a first peak and a second peak as defined above.

In order for a pair of peaks to qualify as a first peak and a second peak as defined above, there must be a valley as described above between the two peaks. If three or more peaks are present, a single valley could qualify as the required valley between more than one pair of peaks. To illustrate this point, reference is made to FIG. 4. Three peaks are present, located at 400 µm, 510 µm, and 610 µm. The pair of peaks at 400 µm and 510 µm qualify as first and second peaks because they have the required characteristics, including the valley between them at 450 µm. Similarly, the pair of peaks at 400 µm and 610 µm also qualify as first and second peaks because they have the required characteristics, including the valley at 450 µm that lies between them. Thus the valley at 450 µm can serve as the required valley in two different pairs of peaks that qualify as first and second peaks.

When the collection of polymer beads is made by the method of the first aspect of the present invention, it is expected that each collection of monomer droplets will become polymer beads that form a peak in the volume distribution of diameters in the collection of polymer beads. It is also contemplated that when two or more collections of monomer droplets have volume-average diameters that are close to each other, those two collections of monomer droplets will, after polymerization, contribute to a feature in the volume distribution of diameters in the collection of polymer beads that may be a single peak that qualifies as a "first peak," or a single peak that has full width at half maximum of more than 75 µm, or a feature that is not a single peak. Regardless of how the collections of monomer droplets do or do not combine to form features of the volume distribution of diameters in the collection of polymer beads, that distribution will have, possibly among other features, the first peak and the second peak described above.

Preferably, the polymer beads in the collection of polymer beads all have the same composition. Preferably the amount of polymer in the polymer beads is, by weight based on the weight of polymer beads, 80% or more; more preferably 90% or more; more preferably 95% or more. Preferably the polymer beads contain polymerized units of monomers that are the same as the preferred types and amounts of monomers described above as preferred for the content of the collections of monomer droplets.

In the volume distribution of polymer bead diameters, D10 is preferably 200 µm or larger; more preferably 300 µm or larger. In the volume distribution of polymer bead diameters, D80 is preferably 1,000 µm or smaller; more preferably 900 µm or smaller; more preferably 800 µm or smaller.

Preferably, the collection of polymer beads has volume average sphericity W of 0.7 to 1.0; more preferably 0.8 to 1.0; more preferably 0.9 to 1.0; more preferably 0.95 to 1.0.

FIG. 1 shows a hypothetical distribution of polymer particles. The vertical axis is an arbitrary scale that shows the relative amount, by volume, of particles at each diameter. The peaks and valleys are marked to illustrate how the parameters PM1, PD1, PM2, PD2, and VM1 are determined.

Figure 2:
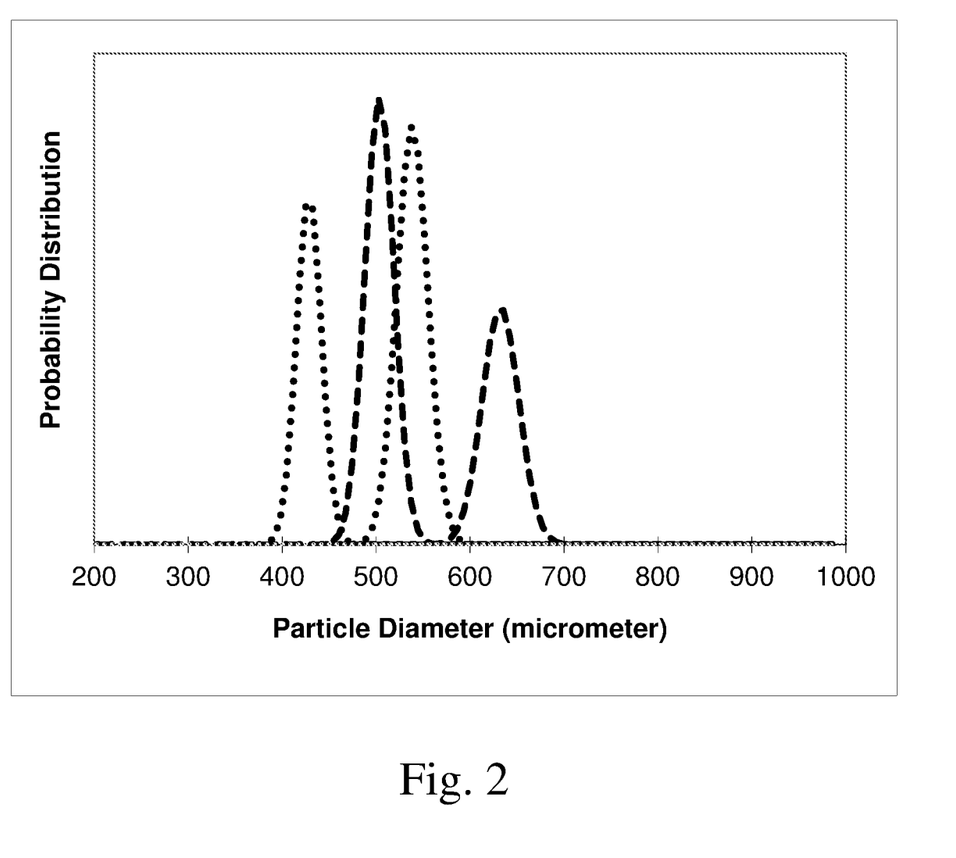
FIG. 2 shows an overlay of the volume distributions of diameters for four different hypothetical collections of monomer droplets.
Figure 3:
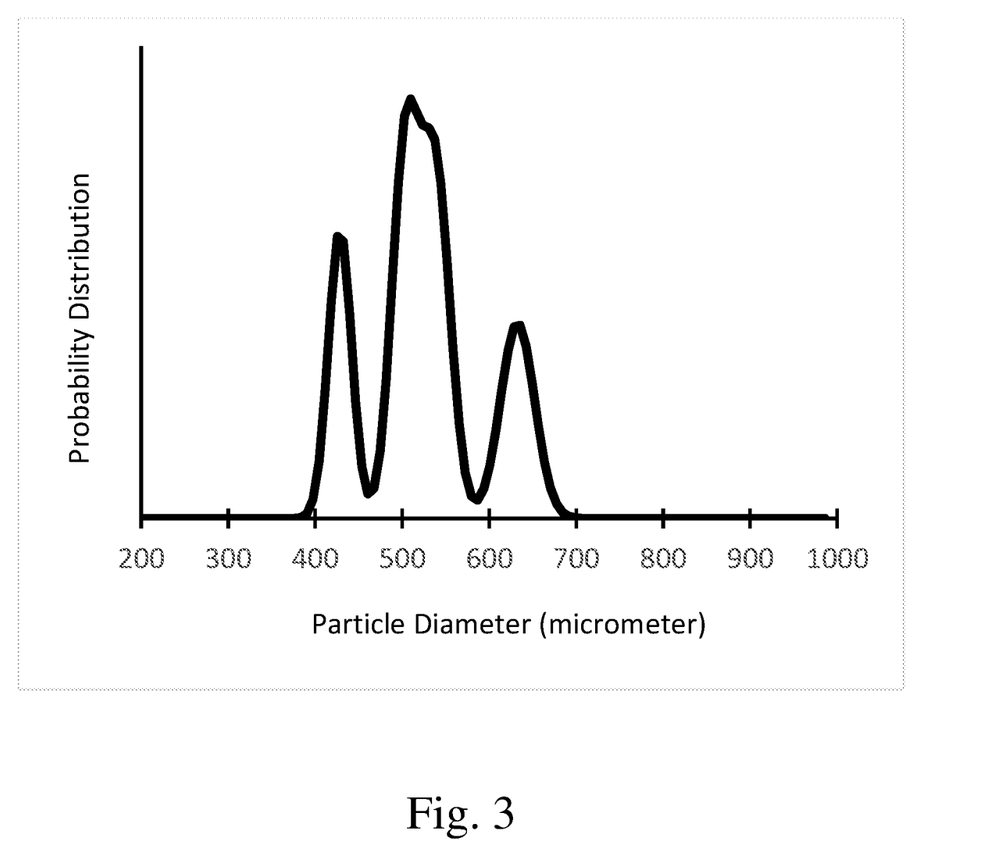
FIG. 3 shows the distribution resulting from adding together the four distributions shown in FIG. 2.

FIG. 2 shows the probability distributions of four separate collections of monomer droplets. The vertical axis is a probability distribution showing the probable amount, on a volume basis, of monomer droplets at each diameter. FIG. 3 shows the sum of the four distributions depicted in FIG. 2.

Figure 4:
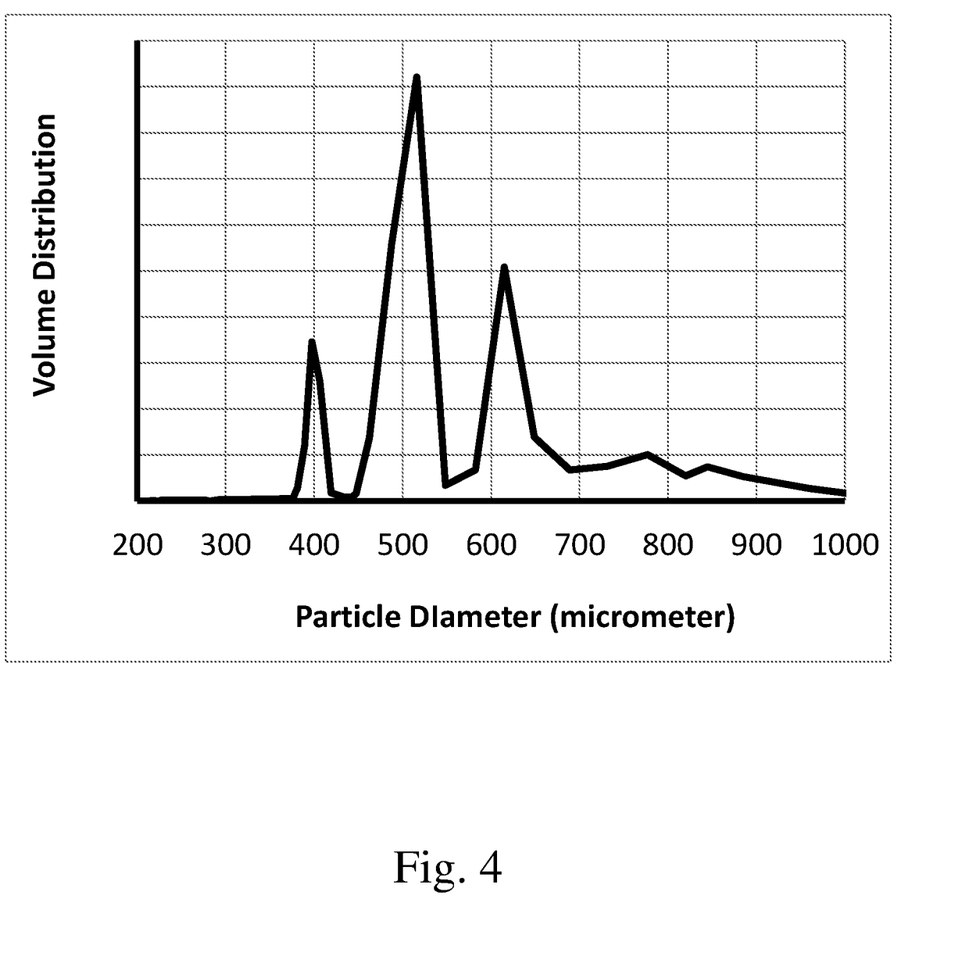
FIG. 4 is the measured volume distribution of diameters of the collection of polymer beads made in Example 1 below.

FIG. 4 shows a measured volume distribution of a collection of polymer beads of the present invention. Details of this collection of polymer beads are given in the Examples below. The vertical axis is an arbitrary scale that shows the relative amount, by volume, of particles at each diameter.

The following are examples of the present invention.

Example 1: Preparation of a Multimodal Distribution

A suspension of droplets suspended in an aqueous medium was made using the procedure as described by U.S. Pat. No. 4,444,960 with an ensemble of particle sizes as described below.

A monomer mixture comprising 83.9 parts by weight styrene, 15.8 parts by weight divinylbenzene (mixture of 63% divinylbenzene and 27% ethylvinylbenzene), and 0.17 parts by weight of a peroxygen initiator was metered into a monomer reservoir, through the openings in an orifice plate, which plate has two openings (the size of which are specified in the table below), for a total of 97 minutes at the four different, sequential, conditions as listed in the table below. The Reynolds number and Strouhal number are defined and used as in U.S. Pat. No. 4,444,960.

| Collection of monomer droplets | Time (min) | Orifice size (um) | Targeted Droplet Size (um) | Flow rate (ml/min) | Reynolds Number (Re) | Strouhal Number (St) |
|---|---|---|---|---|---|---|
| A | 20 | 199 | 447 | 6.5 | 313 | 0.86 |
| B | 30 | 199 | 526 | 6.5 | 313 | 0.53 |
| C | 30 | 199 | 563 | 6.5 | 313 | 0.43 |
| D | 17 | 234 | 662 | 7.6 | 313 | 0.43 |

The first 20 minutes of operation produced collection of monomer droplets "A." Then, only the Strouhal number was changed, and operation continued for 30 minutes to produce collection of monomer droplets "B" in the same container as collection of monomer droplets "A." Then, only the Strouhal number was changed, and operation continued for another 30 minutes to produce collection of monomer droplets "C" in the same container as collections of monomer droplets "A" and "B." Then the monomer flow was stopped, the 199 µm orifice plate was replaced by the 234 µm orifice plate, and then the monomer flow was resumed and operated for 17 minutes to produce collection of monomer droplets "D" in the same container as collections of monomer droplets "A" and "B" and "C."

To break the monomer jets into uniformly sized droplets, the jets were vibratorily excited at different Strouhal Numbers, dependent on the desired drop diameter. The resulting uniform sized droplets rose through the column which comprises a co-currently fed aqueous solution of 0.05 weight percent of a carboxymethyl methyl cellulose. The monomer droplets flowed from the upper end of the column into a polymerization reactor with continuous agitation until a suspension comprising about 40 volume percent of the unpolymerized monomer droplets, based on the volume of monomer and continuous phases, was obtained. Sufficient amounts of additional carboxymethyl methyl cellulose were added to the polymerization reactor to make the total concentration of the suspending agent about 0.15 percent based on the weight of the suspending medium. Sufficient amounts of sodium dichromate were added to the polymerization reactor to make the total concentration about 0.13 percent based on the suspending medium. The monomer was then polymerized by heating the reactor to about 81° C. for a period of about 7 hours followed by heating the reactor for an additional 1.5 hours at about 100° C. while agitating the suspension at conditions which minimize the coalescence or further dispersion of the droplets. At the end of this period the resulting polymer beads were recovered, free of suspending medium, using conventional filtration techniques and were subsequently dried. The dried beads were screened by passing through a screen of mesh number 20 and by being retained on a screen of mesh number 60. To measure the volume distribution of diameter, the dried beads were mixed with water to form a slurry, which was measured by optical image analysis using a FlowCam™ (Fluid Imaging Technologies, Inc.). The slurry flowed past a camera, which recorded images of the particles. The diameter of each particle was determined by taking the mean of 36 Feret diameters at 5° intervals. A multi-point calibration from 74 to 1,700 µm was used. Results are shown in FIG. 4. Yield was estimated at 91%.

FIG. 2 shows four peaks corresponding to the volume distributions of four hypothetical collections of monomer droplets. FIG. 3 shows the sum of the four peaks in FIG. 2. Thus FIG. 3 is a theoretical prediction of the distribution that would result if the four hypothetical collections of monomer droplets shown in FIG. 2 were present in the same container.

It is contemplated that when a collection of monomer droplets undergoes suspension polymerization, the monomer in each monomer droplet polymerizes in that droplet, thus converting each monomer droplet to a polymer bead of approximately the same size. Therefore it is contemplated that the volume distribution of polymer beads that results from a suspension polymerization process will be similar or identical to the volume distribution of monomer droplets that existed prior to the start of polymerization.

The conditions for collections of monomer droplets A, B, C, and D described above were chosen in an attempt to create four actual collections of monomer droplets that would be well described by the four peaks shown in FIG. 2. It was then expected that the volume distribution of diameters of the final composite collection of monomer droplets (that is, the collection of monomer droplets that was present in the container at the conclusion of forming collection of monomer droplets D) would be well described by FIG. 3. It was also expected that the polymer beads obtained by suspension polymerization of the final composite collection of monomer droplets would also be well described by FIG. 3.

The measured volume distribution of polymer beads produced of Example 1 is shown in FIG. 4. It can be seen that the theoretical distribution in FIG. 3 matches the measured distribution in FIG. 4 very well.

Example 2: Measurement of Packing Density

Packing density was measured by the following method. The "as received" resin in an amount of weight W was placed into a dry, tared graduated cylinder. The resin sample was gently tapped to a constant volume V. The packing density was calculated as follows:

Packing Density(kg/m³)=1000×$W$(g)/$V$(ml)

A comparative sample (Comparative 2) was as follows. Resin beads of polymer composition 90 parts by weight styrene and 10 parts by weight divinylbenzene (mixture of 63% divinylbenzene and 27% ethylvinylbenzene); harmonic mean diameter 490 µm, and uniformity coefficient of 1.05.

The packing densities were as follows:

| Sample | Packing Density |
| --- | --- |
| Example 1 | 650 kg/m³ (40.6 lb/ft³) |
| Comparative 2 | 632 kg/m³ (39.5 lb/ft³) |

The Example polymer beads have higher packing density than the Comparative polymer beads.

Example 3: Preparation of Another Example Distribution

A suspension of droplets suspended in an aqueous medium was made using a procedure similar to that described by U.S. Pat. No. 4,444,960.

A monomer mixture comprising 83.9 parts by weight styrene, 15.8 parts by weight divinylbenzene (mixture of 63% divinylbenzene and 27% ethylvinylbenzene), and 0.17 parts by weight of a peroxygen initiator was metered into a monomer reservoir, through the openings in an orifice plate, which plate has two openings, each having diameter 199 µm, for a total of 1007 minutes at the five different, sequential, conditions as listed in the table below. The Reynolds number and Strouhal number are defined and used as in U.S. Pat. No. 4,444,960. For all five conditions, flow rate was 6.5 ml/min and the Reynolds number was 313.

| Collection of monomer droplets | Time (min) | Targeted Droplet Size (um) | Strouhal Number (St) |
| --- | --- | --- | --- |
| A | 20 | 447 | 0.86 |
| B | 20 | 474 | 0.73 |
| C | 20 | 500 | 0.62 |
| D | 20 | 526 | 0.50 |
| E | 20 | 557 | 0.46 |

Each condition was maintained for 20 minutes, then only the Strouhal number was changed, and the next condition was maintained for 20 minutes to produce a new collection of monomer droplets in the same container as all the previous collections of monomer droplets.

Figure 6:
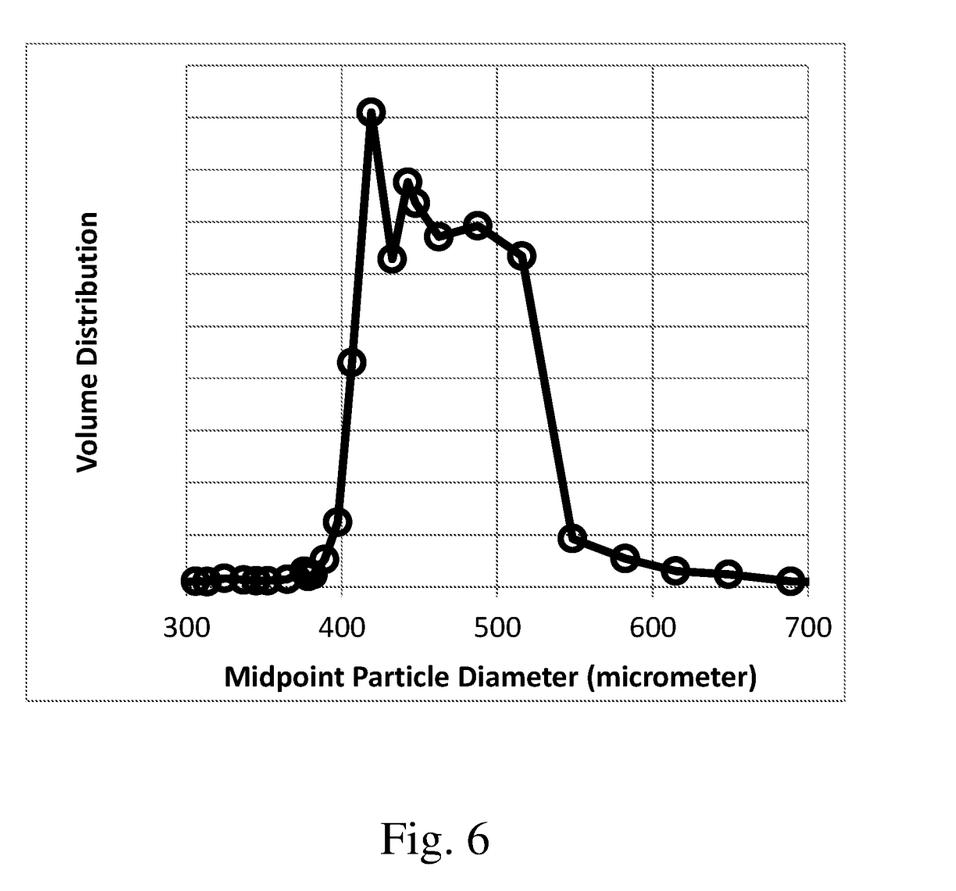
FIG. 6 shows the measured volume distribution of polymer beads produced in Example 3.

To break the monomer jets into uniformly sized droplets, the jets were vibratorily excited at different Strouhal Numbers, dependent on the desired drop diameter. The resulting uniform sized droplets rose through the column which comprises a co-currently fed aqueous solution of polyvinyl alcohol. The monomer droplets flowed from the upper end of the column into a polymerization reactor with continuous agitation until a suspension comprising about 40 volume percent of the unpolymerized monomer droplets, based on the volume of monomer and continuous phases, was obtained. Sufficient amounts of additional carboxymethyl methyl cellulose were added to the polymerization reactor to make the total concentration of the suspending agent about 0.15 percent based on the weight of the suspending medium. Sufficient amounts of sodium dichromate were added to the polymerization reactor to make the total concentration about 0.13 percent based on the suspending medium. The monomer was then polymerized by heating the reactor to about 81° C. for a period of about 7 hours followed by heating the reactor for an additional 1.5 hours at about 100° C. while agitating the suspension at conditions which minimize the coalescence or further dispersion of the droplets. At the end of this period the resulting polymer beads were recovered, free of suspending medium, using conventional filtration techniques and were subsequently dried. The dried beads were screened by passing through a screen of mesh number 20 and by being retained on a screen of mesh number 60. To measure the volume distribution of diameter, the dried beads were mixed with water to form a slurry, which was measured by optical image analysis using a FlowCam™ (Fluid Imaging Technologies, Inc.). Results are shown in FIG. 6. Yield was estimated at 91%.

Figure 5:
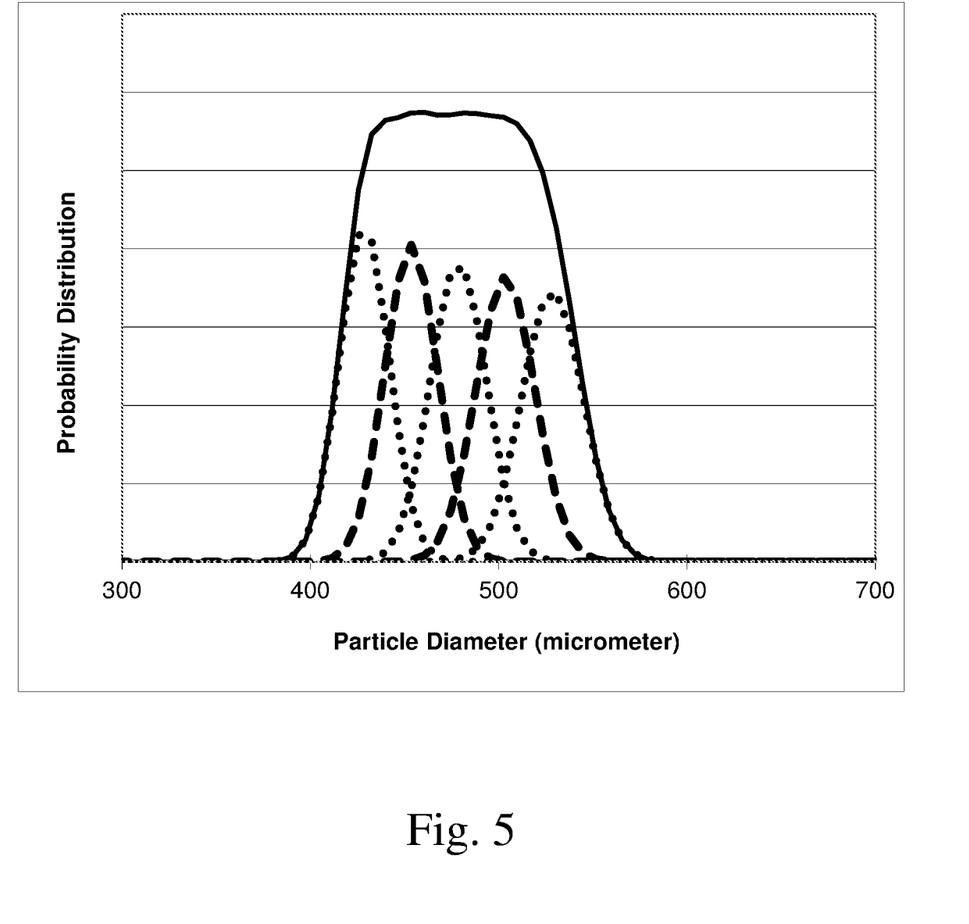
FIG. 5 shows five peaks corresponding to the volume distributions of five hypothetical collections of monomer droplets and the sum of those five peaks.

FIG. 5 shows five peaks corresponding to the volume distributions of five hypothetical collections of monomer droplets, displayed as dotted lines. FIG. 5 also shows the sum of those five peaks; the sum is displayed as a solid line. Thus the solid line in FIG. 5 is a theoretical prediction of the distribution that would result if the five hypothetical collections of monomer droplets shown in the dotted lines of FIG. 5 were present in the same container.

It is contemplated that when a collection of monomer droplets undergoes suspension polymerization, the monomer in each monomer droplet polymerizes in that droplet, thus converting each monomer droplet to a polymer bead of approximately the same size. Therefore it is contemplated that the volume distribution of polymer beads that results from a suspension polymerization process will be similar or identical to the volume distribution of monomer droplets that existed prior to the start of polymerization.

The conditions for collections of monomer droplets A, B, C, D, and E described above were chosen in an attempt to create five actual collections of monomer droplets that would be well described by the five peaks shown in FIG. 5. It was then expected that the volume distribution of diameters of the final composite collection of monomer droplets (that is, the collection of monomer droplets that was present in the container at the conclusion of forming collection of monomer droplets E) would be well described by FIG. 5. It was also expected that the polymer beads obtained by suspension polymerization of the final composite collection of monomer droplets would also be well described by FIG. 5.

The measured volume distribution of polymer beads produced of Example 3 is shown in FIG. 6. It can be seen that the theoretical distribution in the solid line of FIG. 5 matches the measured distribution in FIG. 6 very well.

The invention claimed is:

1. A method of making a collection of polymer beads comprising
    (a1) forming a first collection of monomer droplets in an aqueous medium in a container, wherein the first collection of monomer droplets has volume-average diameter DAV1 and has uniformity coefficient less than 1.3;
    (a2) forming a second collection of monomer droplets in the aqueous medium in the container, wherein the second collection of monomer droplets has volume-average diameter DAV2 and has uniformity coefficient less than 1.3, wherein DAV1 and DAV2 differ by 10 μm or more;
    wherein either step (a1) and step (a2) are performed simultaneously; or step (a2) is performed after step (a1), while the first collection of monomer droplets remains in the container; or a combination thereof; and
    (b) after steps (a1) and (a2), polymerizing the monomer droplets by suspension polymerization to form the polymer beads.

2. The method of claim 1, wherein the method further comprises the step, performed prior to step (b), of
    (a3) forming a third collection of monomer droplets that has a volume-average diameter DAV3 and has uniformity coefficient less than 1.3
    wherein either steps (a1), (a2), and (a3) are performed simultaneously; or step (3) is performed after step (a1), while the first collection of monomer droplets remains in the container; or step (3) is performed after step (a2), while the second collection of monomer droplets remains in the container; or a combination thereof.

3. The method of claim 1,
    wherein the first collection of monomer droplets comprises one or more monomer selected from styrenic monomers, acrylic monomers, and mixtures thereof, and
    wherein the second collection of monomer droplets comprises one or more monomer selected from styrenic monomers, acrylic monomers, and mixtures thereof.

4. The method of claim 1, wherein the first collection of monomer droplets comprises one or more multifunctional vinyl monomer and one or more monofunctional vinyl monomer, and wherein the second collection of monomer droplets comprises one or more multifunctional vinyl monomer and one or more monofunctional vinyl monomer.

* * * * *